2,880,139

ELECTROLYTIC PROCESS FOR PREPARING ZINC-CONTAINING ADRENOCORTICOTROPHIN COMPOSITIONS AND COMPOSITIONS MADE THEREBY

Seymour Z. Lewin, New York, N.Y., and Eugene Schapiro, Nutley, and Richard T. Price, Cedar Grove, N.J., assignors to Organon Inc., Orange, N.J., a corporation of New Jersey No Drawing. Application September 5, 1957
Serial No. 682,082

13 Claims. (Cl. 167—74)

This invention relates to an electrolytic process for preparing zinc-containing therapeutic compositions and to the resulting compositions.

It is well-known that many effective therapeutic agents in the medical armamentarium present serious, practical disadvantages from the point of view of their administration. Among the disadvantages which may be mentioned here are the lack of stability of some compositions from the time of manufacture to the time of use; the lack of uniformity between different batches; the difficulties presented to the medical profession in finding a practical carrier for the therapeutic agent; and the undesirably short duration of effectiveness of some therapeutic agents, necessitating administration of the composition frequently during the course of one day to the patient.

Great strides have been made in alleviating these conditions. In this connection, it may be noted that marked improvements in the administration of therapeutic substances have been made in recent years by the use of such substances with liquid or solid carriers. Penicillin and adrenocorticotrophin hormone therapy are two examples where such efforts have been fruitful.

Nevertheless, there still remains a need for further improvement in the administration of many drugs which are used in connection with solid, substantially water-insoluble carriers. For one thing, it is desirable to reduce to the optimum the amount of such carriers employed with a given amount of the therapeutic substance, in order to minimize the introduction into the body of unnecessary, substantially non-therapeutic materials. Such materials may cause undesired reactions either at the point of administration (if, for example the composition is injected), or to some particular organ, or, in some cases, may interfere unduly with absorption into the blood stream.

Another problem often associated with the administration of drugs on substantially water-insoluble carriers is the non-uniformity of therapeutic action caused by the non-uniformity of the carriers. Such non-uniformity often arises by reason of the fact that such carriers are not true individual substances but are rather a mixture of closely related materials, some but not all of which are useful for the intended purpose.

An object of this invention is to provide a novel improved process for making pharmaceutical preparations containing therapeutic substances disposed on a suitable, substantially water-insoluble carrier.

Another object of our present invention is to provide improved pharmaceutical preparations containing therapeutic substances disposed on a suitable, substantially water-insoluble carrier.

Other objects of this invention will become apparent from the following description.

In essence, we attain the foregoing objects by forming a substantially water-insoluble complex of a therapeutic substance and an electrolytically-prepared zinc compound, such as alpha-zinc hydroxide and basic zinc salts crystallographically equivalent to alpha-zinc hydroxide, such as basic zinc acetate, basic zinc phosphate, basic zinc sulfate and basic zinc chloride. Any reference in this application to alpha-zinc hydroxide is understood to apply to basic zinc salts crystallographically equivalent thereto, wherever the context so admits or requires.

In order more fully to illustrate the preferred embodiment of this invention, we shall describe it in detail as exemplified in connection with the preparation of compositions containing adrenocorticotrophic hormone. It will be understood that such detailed description is not intended for purposes of limitation but is intended for purposes of illustration.

As is well known, adrenocorticotrophic hormone, hereinafter sometimes referred to as ACTH, is a substance secreted by the anterior lobe of the pituitary gland and is carried by the blood stream in the body to the adrenal gland, where it exerts an influence on the development, growth and activity of the adrenal cortex. The ACTH is derived from the pituitary glands of animals such as hogs, sheep and cattle. When injected parenterally it has been successful in the treatment of collagen or connective tissue diseases, such as rheumatoid arthritis, rheumatic fever, many acute inflammatory diseases of the eye, cases of extensive and severe burns, asthma and many diseases due to adrenal cortical hypofunction.

In view of the relatively short supply of ACTH in the face of an increasing demand therefor, efforts have been made to increase the yields of the hormone from available sources. Also, because of the relatively short period of duration of therapeutic effect, it is necessary to administer preparations containing ACTH at all-too-frequent intervals during each day of treatment, a condition which is undesirable from the point of view of the medical profession as well as that of the patient; and, accordingly, efforts to prolong the activity of ACTH-containing preparations have been made.

ACTH-containing preparations resulting from prior efforts contained a combination of the hormone with one or more vehicles, such as gelatin preparations, with or without other retarding agents, such as polyvinyl pyrrolidone and aluminum phosphate, which reduce the rate of absorption of the hormone into the blood stream either by virtue of the viscosity or other mechanical properties of such retarding agents. However, some such preparations are viscous and it is necessary to liquefy them by heating in order to permit administration by injection. Some of the known preparations also have the drawback that they give rise to local irritation after injection.

Other disadvantages of prior preparations not possessed by those of the present invention include the following:

(1) So-called simple ACTH liquid preparations are too short in duration of therapeutic effect.

(2) Preparations involving ACTH in gel form also have undesirable short duration of action. Also, the gel, being thick and cumbersome to handle, must be heated in order to melt it prior to use; hypersensitivity to the gelatin may occur; and the gel is hypertonic and leads to pain on injection.

(3) Preparations containing polyvinyl pyrrolidone and carboxy methyl cellulose are disadvantageous as these named materials are not totally metabolized and may lead to tumor formation or piling up in the body reservoirs of the reticulo-endothelial system.

(4) Preparations containing so-called hyaluronidase inhibitors such as hesperidin are not clearly effective as delaying agents for producing repository preparations.

A substantial improvement in ACTH-containing preparations was made by Homan and Neutelings, who, in co-pending U.S. patent application, Serial No. 403,548, filed January 12, 1954, now Patent No. 2,807,569, disclose and cover such compositions, as well as the process for preparing them, involving the formation of a practically water-insoluble ACTH-metal compound (including zinc compounds) complex. The resulting preparations not only possess a considerably prolonged activity but also an enhanced synergistic effectiveness, considerably greater than that which may be expected on the basis of actual hormone content.

While preparations made in accordance with the Homan and Neutelings teachings are of practical use and represent a desired improvement, nevertheless, it has been found that more uniform and effective preparations similar to those of Homan and Neutelings can be prepared in an entirely different, commercially-feasible and technically-simple manner, as will hereinafter more particularly be described.

In conducting our novel process we may form the desired complex in situ during the electrolytic preparation of the zinc compound; or, if desired, we may first prepare the zinc compound electrolytically and then add the therapeutic substance to a suspension of the zinc compound to form the complex. While, in general, the results obtained by either method are satisfactory and the particular method followed is optional, we presently prefer to form the desired complex in situ as the union between the components appears more firm when the complex is formed in that manner.

It is noted that whichever method is employed in accordance with this invention the same conditions regarding electrolytic formation of the zinc compound and proportions of ingredients, etc. apply. For purposes of the following general description of our present process we shall therefore only refer to the first of the alternative methods in order to avoid repetition.

The process is conducted in a conventional electrolytic cell suitable for the production of zinc ions at the anode and hydroxyl ions at the cathode. Such a cell can have a zinc anode and a platinum or other inert cathode, such as silver, gold and graphite, the electrolyte advantageously being an aqueous solution of sodium chloride or other pharmaceutically-acceptable electrolyte. A suitable amount of ACTH is dissolved into the electrolytic vehicle. Other materials, such as preservatives and buffers, may be introduced into the electrolytic vehicle, if desired, it being understood that any such substance employed must be compatible with the preparation and the human body in the concentrations employed and must not cause any irritating, toxic or other untoward effects.

A suitable electric current, e.g., from a battery source, is passed through the cell. The amount of current flowing through the cell is measured and controlled by a milliampere meter and rheostat, respectively, these being connected in series in the circuit.

The electrolysis generates alpha-zinc hydroxide or a crystallographically equivalent basic zinc salt, the nature of the salt being determined by the composition of the carrier electrolyte. Any of these species carries the ACTH down with it as a flocculent precipitate. The electrolysis is continued until the desired amount of zinc precipitate has been formed, this amount being from about 0.2 to 3.0 mg. equivalent of elementary zinc per 20–80 units, preferably 40 units, of ACTH. The term "units" as used herein in reference to biological activity, refers to U.S. Pharmacopoeia units as determined by the subcutaneous method. The insoluble material suspended in the vehicle is removed from the cell in any suitable manner.

It will be understood that the usual procedures and precautions followed in conducting electrolytic processes are to be borne in mind in conducting the herein-disclosed process. Since such procedures and steps do not form any part of this invention, however, they are not set forth herein.

The aqueous sodium chloride solution or other electrolyte may vary in concentration over rather wide limits. For example, we may use solutions having an NaCl normality from about 0.01 N to about 2.0 N. Solutions having a NaCl strength lower than about 0.01 N are so high in resistance that the electrolytic process requires an unduly long time, from the practical viewpoint; and, furthermore, the resulting complex does not possess properties as desirable as otherwise. Solutions having NaCl concentrations higher than about 2.0 N are not recommended as the ACTH is "salted-out." We have obtained excellent results with solutions from about 0.10 to about 0.15 normality.

The ACTH dissolved in acidified water, as hereinafter indicated, is introduced into the electrolytic vehicle. Any commercially- and pharmaceutically-acceptable ACTH may be employed. However, we have found that the purer the ACTH, i.e. more units per milligram, the less zinc compound is needed to effect coprecipitation of most of the ACTH.

We have also found that the ACTH may be employed in widely varying amounts, practical dosage considerations for therapy being the determining factor. For example, while, theoretically, very small or very large quantities of ACTH could be used such would be impractical. Between such extremes it may be said that an amount of dissolved ACTH sufficient to give compositions of practical utility can be used. We presently prefer to employ an amount of ACTH equivalent in biological activity to from about 20 to 80 units per about 0.2 to about 3.0 mg. of equivalent elemental zinc.

If desired, other substances may be added to the electrolyte in accordance with our invention. Such other substances include:

(a) Preservatives, e.g., phenol or benzyl alcohol in amounts normally used in pharmaceutical practice; and/or (b) Adjuvants, e.g., glycerol, to achieve isotonicity; and/or (c) Local anesthetics, e.g., procaine hydrochloride; and/or (d) Other therapeutic substances not incompatible with the other ingredients employed.

As aforesaid, the process of this invention does not require any special electrolytic procedures or precautions. Temperatures below, at, or somewhat above normal room temperature (20°–30° C.) can be used, practical considerations usually dictating the prevailing room temperature as that used. It is important, however, that means for effective agitation of the mixture during the electrolysis should be supplied for best results. Inadequate agitation can cause the formation of substantial amounts of forms of metal compounds other than those such as the desired alpha-zinc hydroxide form or local heating or denaturation of protein and non-uniform incorporation of ACTH in the precipitate.

Insofar as the current density employed in accordance with the present process is concerned, this too can be varied over wide limits. As illustrative we note that current densities between about 0.25 to about 2,500 milliamperes per square centimeter give desirable results. We have obtained advantageous results with current densities from about 2.5 to about 25 milliamperes per square centimeter.

The initial pH of the solution may vary within wide limits. It should not be so low as to permit the zinc anode to be attacked and $Zn^{++}$ to be formed in solution before electrolysis starts as this leads to undesirably high proportions of metallic compound to ACTH in the final complex or precipitate. An initial pH from about 2 to about 5 has been found advantageous. ACTH is not very stable at a pH over 6.

As the electrolysis proceeds the pH gradually rises. Precipitation starts at a pH of about 5–6. The pH continues to rise to about 7 to 7.5 and remains thereat for the remainder of the electrolysis. The alpha-zinc hydroxide appears to act as its own buffer to maintain the pH at about 7 to about 7.6. After electrolysis has been completed, the pH may be increased, if desired, by addition of suitable basic materials.

Where the ACTH is added to the electrolytically-prepared metal compound in accordance with the present process after preparation of said compound, it is understood that the addition should be conducted prior to any significant crystallographic change of the metal compound. For example, in the case of alpha-zinc hydroxide, such addition should occur within a few minutes after the conclusion of the electrolysis. If an hour or more is allowed to elapse before addition of the ACTH to the zinc precipitate only small amounts of the ACTH are incorporated in the precipitate. In this connection, it is found that these amounts are even less than 25% of the amount of ACTH which is incorporated when the electrolysis is conducted in the presence of the ACTH.

We intend to cover complexes prepared by the aforesaid "in situ" method as well as complexes prepared by adding the ACTH, or other therapeutic material, to the electrolytically-prepared metal compound within a few minutes after preparation of said compound. The term "co-precipitated," as used herein, refers to both of said methods.

As hereinbefore noted, the compositions obtained in accordance with our present invention possess useful and advantageous properties in connection with the treatment of conditions for which ACTH is indicated. In addition, it has surprisingly been found that such compositions possess superior aging properties than even those made in accordance with the aforesaid Homan and Neutelings' co-pending patent application. Tests also have shown that the herein-disclosed compositions contain the solid phase in a smaller particle size than is the case with the Homan and Neutelings product.

The products of this invention offer improved advantages over the aforesaid Homan et al. product. Among these advantages are noted the smaller particle size of the instant products; their ease of suspension in suitable vehicles; their resistance to breakdown when subjected to alternate freezing and thawing; and their slower settling after re-suspension and the ease of manufacturing compared with that used by Homan et al.

The usual initial dose of the composition of the adrenocorticotropin complex as prepared in the following examples is one cc. daily, injected subcutaneously or intramuscularly. Each cc. contains 40 U.S.P. units. Such dosage may be individualized to the requirements of each patient and the disease under treatment. 20 U.S.P. units may suffice but 8 to 100 units may be required in some cases. The enhanced and prolonged acting composition so prepared, allows for lower doses and less frequent administration than that attributed to previously available products. Once symptoms have been controlled, dosage may be diminished in keeping with the requirements of each case and the interval between such doses increased to once every three or four days.

In order more fully to illustrate our invention but without limiting it thereto, we set forth the following examples.

Example I 2000 cc. of an aqueous solution was prepared which contained per cc. 10 mg. benzyl alcohol as a preservative, and 6 mg. sodium chloride to render it isotonic. In this solution, corticotropin was dissolved in quantity sufficient to provide 40 U.S.P. units per cc. After adjustment of the pH to 3.0 with hydrochloric acid, the solution was sterilized by filtration through a bacteriological candle. Using aseptic manipulations, a sterile platinum cathode and a sterile zinc anode were introduced into the above solution, together with a stirring assembly, and an electric current of 475 milliamperes was passed through the solution which was kept well agitated. The formed alpha-zinc hydroxide coprecipitated the corticotropin, and after about 3½ hours an amount of alpha-zinc hydroxide equivalent to 2 gm. zinc had been formed which carried with it practically all of the corticotropin. The pH of the suspension was 7.5.

Example II 150 cc. of an aqueous solution was prepared which contained per cc. 13.3 mg. benzyl alcohol as a preservative, and 8 mg. sodium chloride to render it isotonic. A platinum cathode and zinc anode were introduced into the above solution, together with a stirrer, and an electric current of 475 milliamperes was passed through the solution which was stirred continuously. After about 25 minutes an amount of alpha-zinc hydroxide was formed which was equivalent to 0.2 gm. zinc. At this point the electrodes were disconnected and 50 cc. of an aqueous solution containing 8000 U.S.P. units of corticotropin, previously adjusted to pH 3.0 with hydrochloric acid, were added to the well stirred suspension. After the adsorption of the corticotropin was practically completed, the pH was readjusted to 7.5 with a sodium hydroxide solution.

Example III 200 cc. of an aqueous solution was prepared which contained per cc. 9 mg. sodium chloride. In this solution corticotropin was dissolved in quantity sufficient to provide 40 U.S.P. units per cc. After the adjustment of the pH to 3.0 with hydrochloric acid a platinum cathode and a zinc anode were introduced into the above solution together with a stirrer. An electric current of 450 milliamperes was then passed through the solution which was stirred continuously. The formed alpha-zinc hydroxide coprecipitated the corticotropin, and after about 30 minutes an amount of alpha-zinc hydroxide equivalent to 0.2 gm. zinc had been formed which carried with it practically all corticotropin. The pH of the suspension was 7.55.

Example IV 200 cc. of an aqueous solution was prepared which contained per cc. 9 mg. sodium chloride. In this solution corticotropin was dissolved in quantity sufficient to provide 10 U.S.P. units per cc. After the adjustment of the pH to 3.0 with hydrochloric acid a platinum cathode and a zinc anode were introduced into the above solution together with a stirrer. An electric current of 450 milliamperes was then passed through the solution which was stirred continuously. The formed alpha-zinc hydroxide coprecipitated the corticotropin, and after about 30 minutes an amount of alpha-zinc hydroxide equivalent to 0.2 gm. zinc had been formed which carried with it practically all corticotropin. The pH of the suspension was 7.45.

Example V 200 cc. of an aqueous solution was prepared which contained per cc. 9 mg. sodium chloride. In this solution corticotropin was dissolved in quantity sufficient to provide 80 U.S.P. units per cc. After the adjustment of the pH to 3.0 with hydrochloric acid a platinum cathode and a zinc anode were introduced into the above solution together with a stirrer. An electric current of 450 milliamperes was then passed through the solution which was stirred continuously. The formed alpha-zinc hydroxide coprecipitated the corticotropin and after about 30 minutes an amount of alpha-zinc hydroxide, equivalent to 0.2 gm. zinc had been formed which carried with it practically all corticotropin. The pH of the suspension was 7.6.

Example VI 2500 cc. of an aqueous solution was prepared which contained per cc. 6 mg. sodium chloride and 10 mg. benzyl alcohol. In this solution corticotropin was dissolved in quantity sufficient to provide 40 U.S.P. units per cc. After the adjustment of the pH to 3.0 with hydrochloric acid a platinum cathode and a zinc anode were introduced into the above solution together with a stirrer. An electric current of 200 milliamperes was then passed through the solution which was stirred continuously. The formed alpha-zinc hydroxide coprecipitated the corticotropin, and after 3 hours an amount of alpha-zinc hydroxide equivalent to 0.65 gm. zinc was formed which carried with it practically all corticotropin activity. The pH of the suspension was 7.9.

While we have described our invention in detail in its preferred embodiments, it will be obvious to those skilled in the art, after understanding our invention, that various changes and modifications may be made therein without departing from the spirit or scope thereof. We aim in the appended claims to cover all such modifications and changes.

We claim:

1. The process for making a preparation suitable for pharmaceutical use, which comprises forming a substantially water-insoluble complex with at least one electrolytically-prepared member selected from the group consisting of alpha-zinc hydroxide and basic zinc salts crystallographically equivalent to said alpha-zinc hydroxide and adrenocorticotrophin hormone as the therapeutic agent by co-precipitating said electrolytically-prepared member and said therapeutic agent.

2. The process of claim 1 wherein alpha-zinc hydroxide is the electrolytically-prepared member.

3. The process of claim 1 wherein the electrolytically-prepared member is prepared under agitation.

4. The process of claim 2 wherein the alpha-zinc hydroxide is prepared in the presence of the adrenocorticotrophin hormone.

5. The process of claim 4 wherein the alpha-zinc hydroxide is prepared in an electrolytic cell having a zinc anode, a platinum cathode and an electrolyte comprising aqueous sodium chloride.

6. The process of claim 5 wherein the adrenocorticotrophin hormone is present in an amount equivalent to about 20 to 80 U.S.P. units for each about 0.2 mg. to about 3.0 mg. equivalent of elementary zinc as alpha-zinc hydroxide 7. The process of claim 5 wherein the electrolyte is agitated during the electrolysis.

8. The process of claim 6 wherein the normality of the sodium chloride is within the range from about 0.10 to about 0.15 N.

9. The process of claim 8 wherein the initial pH is from about 2 to about 5.

10. A composition suitable for pharmaceutical use, which comprises a substantially water-insoluble complex with at least one electrolytically-prepared member selected from the group consisting of alpha-zinc hydroxide and basic zinc salts crystallographically equivalent to said alpha-zinc hydroxide and wherein adrenocorticotrophin is the theraputic agent, coprecipitated with said member, said complex being characterized by fine particle size, ease of suspension in suitable vehicles, and resistance to breakdown when subjected to alternate freezing and thawing.

11. A composition as defined in claim 10, wherein alpha-zinc hydroxide is the electrolytically-prepared member.

12. A composition as defined in claim 11, wherein the alpha-zinc hydroxide is prepared in the presence of the adrenocorticotrophin hormone.

13. A composition as defined in claim 12, wherein the adrenocorticotrophin hormone is present in an amount equivalent to about 20 to 80 U.S.P. units for each about 0.2 mg. to about 3.0 mg. equivalent of elementary zinc as alpha-zinc hydroxide References Cited in the file of this patent

UNITED STATES PATENTS

| | | |
|---|---|---|
| 771,025 | Oettli | Sept. 27, 1904 |
| 2,807,569 | Homan | Sept. 24, 1957 |

OTHER REFERENCES

Homan: The Lancet, vol. 266, No. 6811, Mar. 13, 1954, pp. 541, 542.

Carr: Science, vol. 116, Nov. 21, 1952, pp. 566–568.